United States Patent
Nakajima (10) Patent No.: US 11,187,938 B2
(45) Date of Patent: Nov. 30, 2021

(54) METHOD OF PRODUCING DISPLAY PANEL

(71) Applicant: SHARP KABUSHIKI KAISHA, Sakai (JP)

(72) Inventor: Nobuhisa Nakajima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 188 days.

(21) Appl. No.: 16/605,951

(22) PCT Filed: Apr. 13, 2018

(86) PCT No.: PCT/JP2018/015464
§ 371 (c)(1),
(2) Date: Oct. 17, 2019

(87) PCT Pub. No.: WO2018/193975
PCT Pub. Date: Oct. 25, 2018

(65) Prior Publication Data
US 2021/0132436 A1    May 6, 2021

(30) Foreign Application Priority Data

Apr. 20, 2017 (JP) .............................. JP2017-083527

(51) Int. Cl.
*G02F 1/1335* (2006.01)

(52) U.S. Cl.
CPC .............. *G02F 1/133528* (2013.01)

(58) Field of Classification Search
CPC ................................................. G02F 1/133528
See application file for complete search history.

(56) References Cited

U.S. PATENT DOCUMENTS

| 5,610,742 A * | 3/1997 | Hinata ................. G02F 1/1333 349/122 |
| 2014/0263211 A1 * | 9/2014 | Hassan ................ B23K 26/361 219/121.69 |
| 2016/0131944 A1 | 5/2016 | Endo et al. |
| 2018/0313991 A1 * | 11/2018 | Yug ...................... B23K 26/351 |

FOREIGN PATENT DOCUMENTS

| CN | 103460268 A | 12/2013 |
| CN | 105834884 A | 8/2016 |
| CN | 106556947 A | 4/2017 |
| JP | 2016-090855 A | 5/2016 |

* cited by examiner

*Primary Examiner* — Phu Vu
(74) *Attorney, Agent, or Firm* — ScienBiziP, P.C.

(57) ABSTRACT

A method of producing a display panel sequentially includes a polarizing plate attachment process of attaching a polarizing plate to a surface of a substrate with a side surface of the polarizing plate being positioned outwardly from a side surface of the substrate, and a polarizing plate trimming process of trimming the side surface of the polarizing plate such that the side surface of the polarizing plate becomes flush with the side surface of the substrate.

3 Claims, 7 Drawing Sheets

METHOD OF PRODUCING DISPLAY PANEL

TECHNICAL FIELD

The present invention relates to a method of producing a display panel.

BACKGROUND ART

In a known method of producing a display panel, a polarizing plate is attached to a mother substrate, and then the polarizing plate and the mother substrate are cut together to produce a display panel having an intended size (Patent Document 1). In another known method, a polarizing plate and a substrate are separately formed, and then the polarizing plate and the substrate are attached to each other.

RELATED ART DOCUMENT

Patent Document
Patent Document 1: Japanese Unexamined Patent Application Publication No. 2016-090855

Problem to be Solved by the Invention

In the method in which the polarizing plate is attached to the substrate, a side surface of the polarizing plate may be positioned inwardly from the side surface of the substrate due to the dimension or attachment tolerance of the polarizing plate. In such a case, the side surface of the polarizing plate would be visible to the user of the display panel. To solve the problem, the outer shape of the polarizing plate may be made larger than that of the substrate. However, this makes it difficult to narrow the frame. In contrast, in the method in which the mother substrate and the polarizing plate are cut together to produce a display panel having an intended size, the side surface of the polarizing plate and the side surface of the substrate are made flush with each other. However, the cutting plane (side surface) may have a microcrack due to a cutting stress. Furthermore, it is technically difficult to cut the mother substrate in a curved shape. Thus, the shape of the display panel is limited.

DISCLOSURE OF THE PRESENT INVENTION

The present invention was made in view of the above-described circumstance. An object is to provide a method of producing a display panel in which a microcrack is unlikely to be generated and the side surface of the substrate and the side surface of the polarizing plate are made flush with each other.

Means for Solving the Problem

To solve the above-described problem, a method of producing a liquid crystal panel according to the present invention sequentially includes a polarizing plate attachment process of attaching a polarizing plate to a surface of a substrate with a side surface of the polarizing plate being positioned outwardly from a side surface of the substrate and a polarizing plate trimming process of trimming the side surface of the polarizing plate such that the side surface of the polarizing plate becomes flush with the side surface of the substrate. The method in which the side surface of the substrate and the side surface of the polarizing plate are trimmed to be flush with each other is unlikely to generate a microcrack in the side surface of the display panel. Furthermore, the method is readily applicable to a display panel having a curved side surface.

Furthermore, in the polarizing plate trimming process, the side surface of the substrate may be polished with a grinder used for trimming the side surface of the polarizing plate. This removes the microcrack in the side surface of the substrate if a microcrack exists, improving the strength of the display panel.

Furthermore, in the polarizing plate trimming process, two polarizing plates having two opposing substrates therebetween may be simultaneously trimmed at the side surfaces. The simultaneous trimming of the two polarizing plates shortens the operation time.

Furthermore, the substrate and the polarizing plate may have a rectangular shape, and only three out of four side surfaces of the polarizing plate may be trimmed in the polarizing plate trimming process. The display panel having a rectangular shape typically has a terminal mounting area, for example, along at least one of the sides. The frame is wider at the one side near the mounting area than the other sides, allowing the side surface of the polarizing plate to be positioned away from the display area within the frame. Thus, the side surface of the polarizing plate is hardly visible. In other words, the side surface of the polarizing plate along the one side near the mounting area is able to be positioned inwardly from the side surface of the glass substrate and does not need to be trimmed. This method in which only three of the four sides of the polarizing plate are trimmed and the other one is not trimmed requires less operation time than a configuration in which all the four sides are trimmed.

Advantageous Effect of the Invention

The present invention provides a method of producing a display panel in which a microcrack is unlikely to be generated and the side surface of the substrate and the side surface of the polarizing plate are made flush with each other.

MODE FOR CARRYING OUT THE INVENTION

First Embodiment

Figure 1:
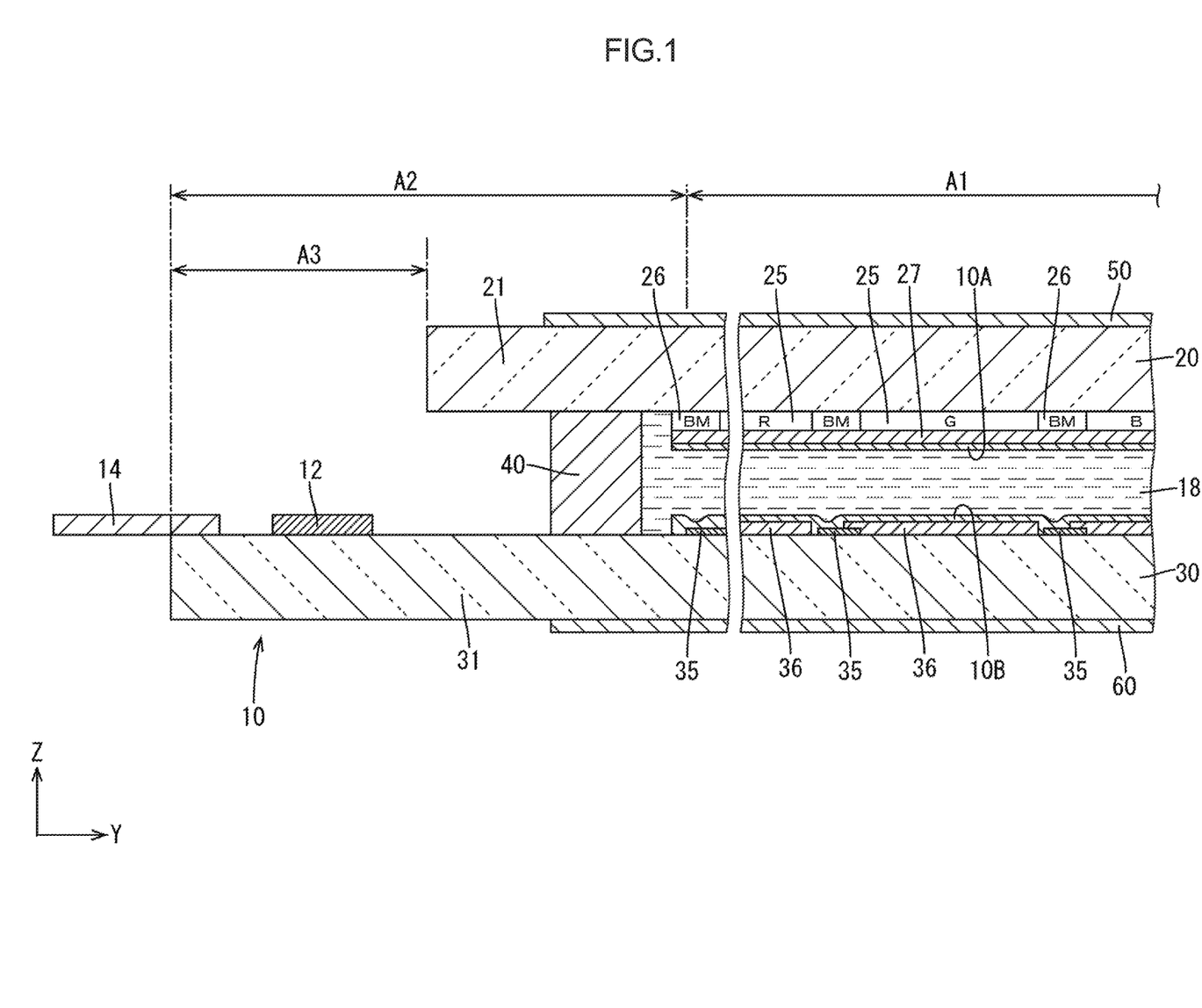
FIG. 1 is a cross-sectional view illustrating a liquid crystal panel according to a first embodiment.

A first embodiment of the invention is described with reference to FIGS. 1 to 6. In this embodiment, a method of producing a rectangular liquid crystal panel 10 (display panel) that constitutes a liquid crystal display device is described as an example. As illustrated in FIG. 1, the front surface of the liquid crystal panel 10 has a display area A1 having a shape (rectangular shape in plan view) corresponding to an outer shape of the liquid crystal panel 10. The upper side in FIG. 1 is a front side of the liquid crystal panel 10 and the lower side in FIG. 1 is a lower side (rear side) of the liquid crystal panel 10. The display area A1 is a portion of a front surface of the liquid crystal panel 10 capable of displaying an image and is a major portion of the front surface. The area outside the display area A1 is a frame-shaped non-display area A2 surrounding the display area A1. The non-display area A2 is a portion of the front surface of the liquid crystal panel 10 incapable of displaying an image. Furthermore, the non-display area A2 has a mounting area A3 where an IC chip 12 (driving member) and a flexible board 14 are mounted at an end in the Y axis direction of the liquid crystal panel 10 (one of four sides along the outer periphery). The IC chip 12 is an electronic component (driver) for driving the liquid crystal panel 10. The flexible board 14 connects a control board (not illustrated) that supplies various signals to the IC chip 12 and the liquid crystal panel 10 to each other.

As illustrated in FIG. 1, the liquid crystal panel 10 includes two substrates 20 and 30 having high light transmitting properties and a liquid crystal layer 18 containing liquid crystal molecules. One of the substrates 20 and 30 on the front side is a CF substrate 20 (color filter substrate) and one on the rear side is an array substrate 30. A portion of the array substrate 30 at one end in the long-side direction protrudes outwardly from the edge of the CF substrate 20 and constitutes the mounting area A3. The end portion of the array substrate 30 (mounting area A3) has the IC chip 12 and a terminal (not illustrated) connected to the flexible board 14. The liquid crystal layer 18 is sandwiched between the substrates 20 and 30. The liquid crystal molecules in the liquid crystal layer 18 change its optical characteristics when the alignment is changed by application of an electrical field. The substrates 20 and 30, respectively, have alignment films 10A and 10B on the inner surfaces to align the liquid crystal molecules in the liquid crystal layer 18 in a predetermined direction. Furthermore, the substrates 20 and 30, respectively, have polarizing plates 50 and 60 on the outer surfaces. The array substrate 30 includes a rectangular glass substrate 31 (substrate), TFTs 35 (Thin Film Transistors), which are switching devices, and pixel electrodes 36 connected to the TFTs 35. The TFTs 35 and the pixel electrode 36 are arranged in a matrix on the inner surface (adjacent to the liquid crystal layer 18) of the glass substrate 31. The array substrate 30 has wiring lines such as source lines, gate lines, and capacitance lines, thereon such that the TFTs 35, for example, are separated. Furthermore, monolithic gate drivers (not illustrated) are dispersedly arranged in the display area A1 of the glass substrate 31. The pixel electrode 36 is formed of a transparent conductive film such as an ITO (Indium Tin Oxide) film and a ZnO (Zinc Oxide) film. The TFT 35 includes an active layer formed of an oxide semiconductor. The alignment film 10B is disposed over the inner surface of the glass substrate 31 to cover the TFTs 35 and the pixel electrodes 36.

The CF substrate 20 includes a rectangular glass substrate 21 (substrate) and R (red), G (green), and B (blue) color filters 25 arranged in a matrix on the inner surface (adjacent to the liquid crystal layer 18) of the glass substrate 21. The glass substrate 21 has a light-blocking layer 26 (black matrix) thereon to separate the color filters 25. A counter electrode 27 formed of a transparent conductive film covers the color filters 25 and the light-blocking layer 26. The alignment film 10A on the inner surface of the glass substrate 21 covers the counter electrode 27. The CF substrate 20 and the array substrate 30 are attached to each other with a sealing member 40. The sealing member 40 extends along the outline of the CF substrate 20 and surrounds the liquid crystal layer 18 in plan view. The display area A1 is located inwardly from the sealing member 40. In the liquid crystal panel 10, a reference potential is applied to the counter electrode 27 on the CF substrate 20 and the potential applied to the pixel electrode 34 is controlled by the TFT 35 such that a potential difference is caused between the pixel electrode 36 and the counter electrode 27. The potential difference allows the liquid crystal molecules in the liquid crystal layer 18 to be aligned in a predetermined direction. The liquid crystal panel 10 displays an image by using light from a backlight device (not illustrated), which is an external light source.

Next, a method of producing the liquid crystal panel 10 is described. A method of producing the liquid crystal panel 10 includes a component formation process (photolithography process) of forming various components, such as a metal film and an insulating film, for example, by a known photolithography method on inner surfaces of the glass substrates 21 and 31 included in the CF substrate 20 and the array substrate 30, a substrate attachment process of attaching the CF substrate 20 and the array substrate 30 to each other with the liquid crystal layer 18 therebetween, a cleaning process of cleaning the outer surfaces of the CF substrate 20 and the array substrate 30, a polarizing plate attachment process of attaching the polarizing plates 50 and 60 to outer surfaces 20A and 30A of the CF substrate 20 and the array substrate 30, and a polarizing plate trimming process of grinding the side surfaces of the polarizing plates 50 and 60. In the following description, the polarizing plate attachment process and the polarizing plate trimming process are described in detail.

Figure 2:
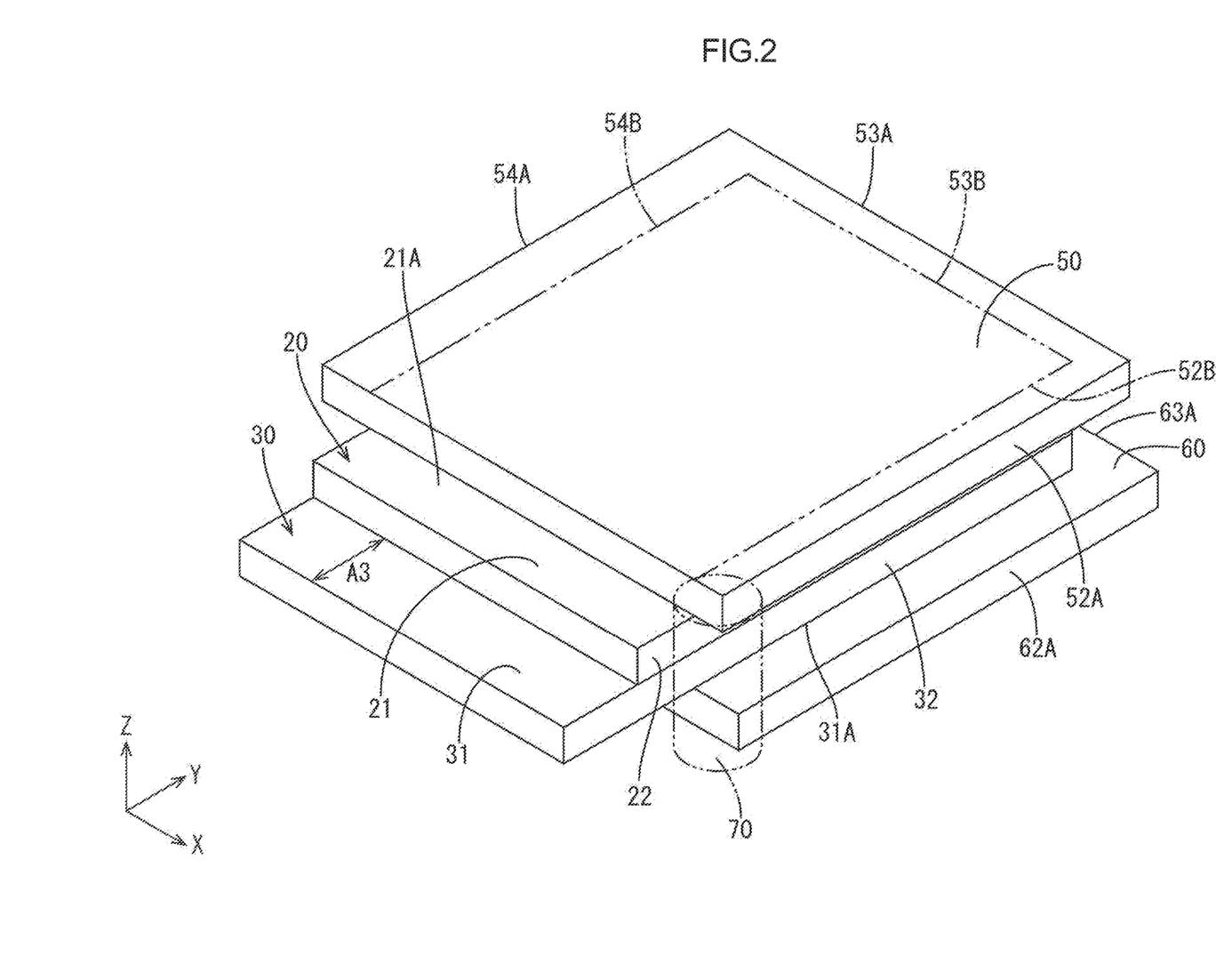
FIG. 2 is a cross-sectional view illustrating the liquid crystal panel in a polarizing plate attachment process.
Figure 5:
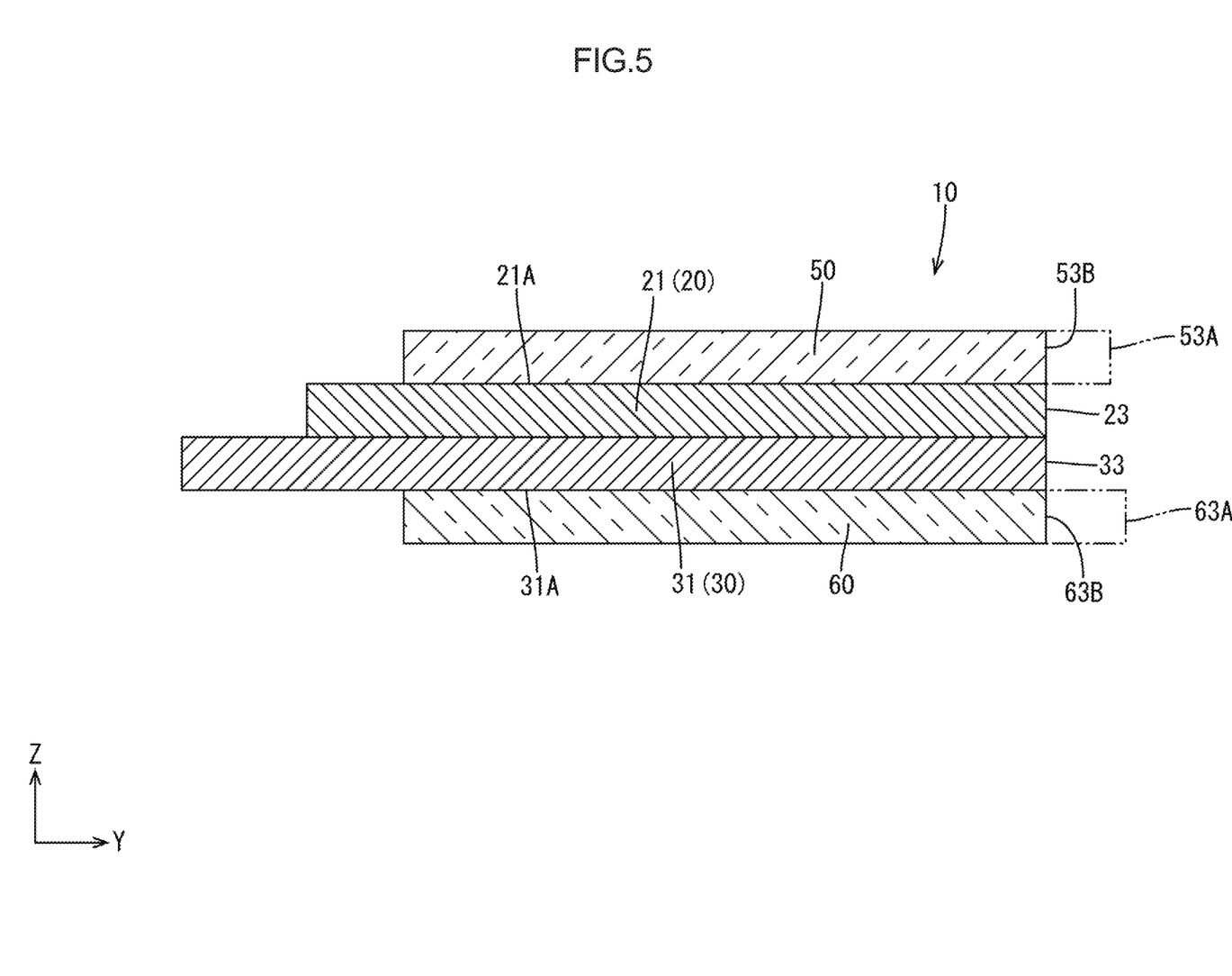
FIG. 5 is a cross-sectional view (corresponding to a view taken along line V-V in FIG. 4) schematically illustrating a liquid crystal panel after the polarizing plate trimming process.
Figure 6:
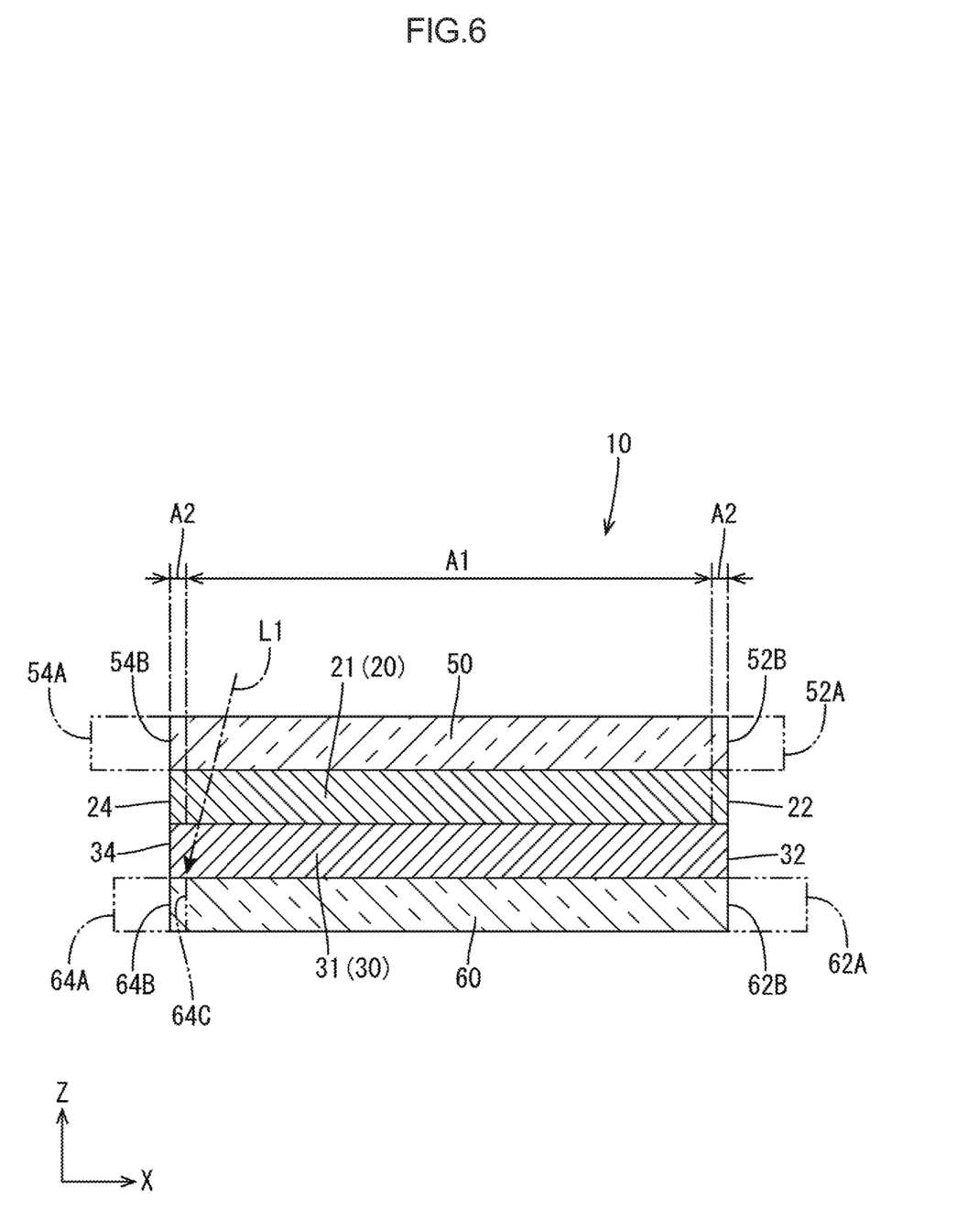
FIG. 6 is a cross-sectional view (corresponding to a view taken along line VI-VI in FIG. 4) schematically illustrating a liquid crystal panel after the polarizing plate trimming process.

As illustrated in FIG. 2, in the polarizing plate attachment process, the polarizing plate 50 is attached to the outer surface 21A of the glass substrate 21 of the CF substrate 20 (surface of the substrate) and the polarizing plate 60 is attached to the outer surface 31A of the glass substrate 31 of the array substrate 30 (surface of the substrate). Thus, the polarizing plates 50 and 60 have the opposing glass substrates 21 and 31 therebetween. In the process of attaching the polarizing plate to the glass substrate, the polarizing plate and the glass substrate are brought into contact with each other with an adhesive therebetween and the polarizing plate is pressed against the glass substrate by a pressing roller (not illustrated). The polarizing plate used in the polarizing plate attachment process has a larger outer shape than the glass substrate with respect to three of the four sides. Specifically described, as illustrated in FIGS. 2, 5, and 6, the polarizing plate 50 is attached to the glass substrate 21 with the three side surfaces 52A, 53A, and 54A (side surfaces before grinding) of the four side surfaces of the polarizing plate 50 being positioned outwardly from the three side surfaces 22, 23, and 24 of the glass substrate 21. Furthermore, as illustrated in FIGS. 2, 5, and 6, the polarizing plate 50 is attached to the glass substrate 21 with the three side surfaces 62A, 63A, and 64A of the polarizing plate 60 being positioned outwardly from the three side surfaces 32, 33, and 34 of the glass substrate 31. In FIGS. 5 and 6, the side surfaces of the polarizing plates 50 and 60 in the polarizing plate attachment process are indicated by a two-dot chain line.

Figure 3:
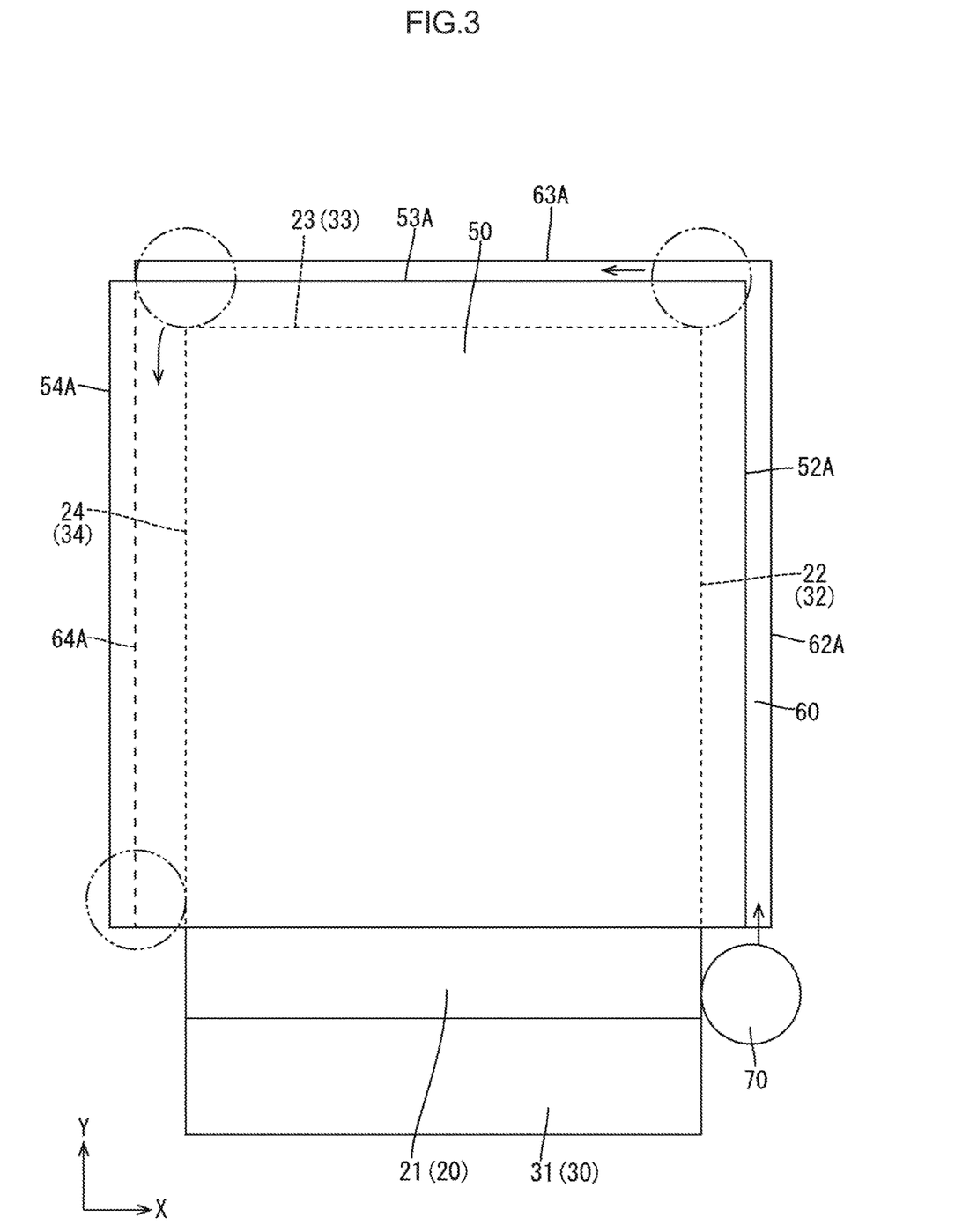
FIG. 3 is a plan view indicating a polarizing plate trimming process.
Figure 4:
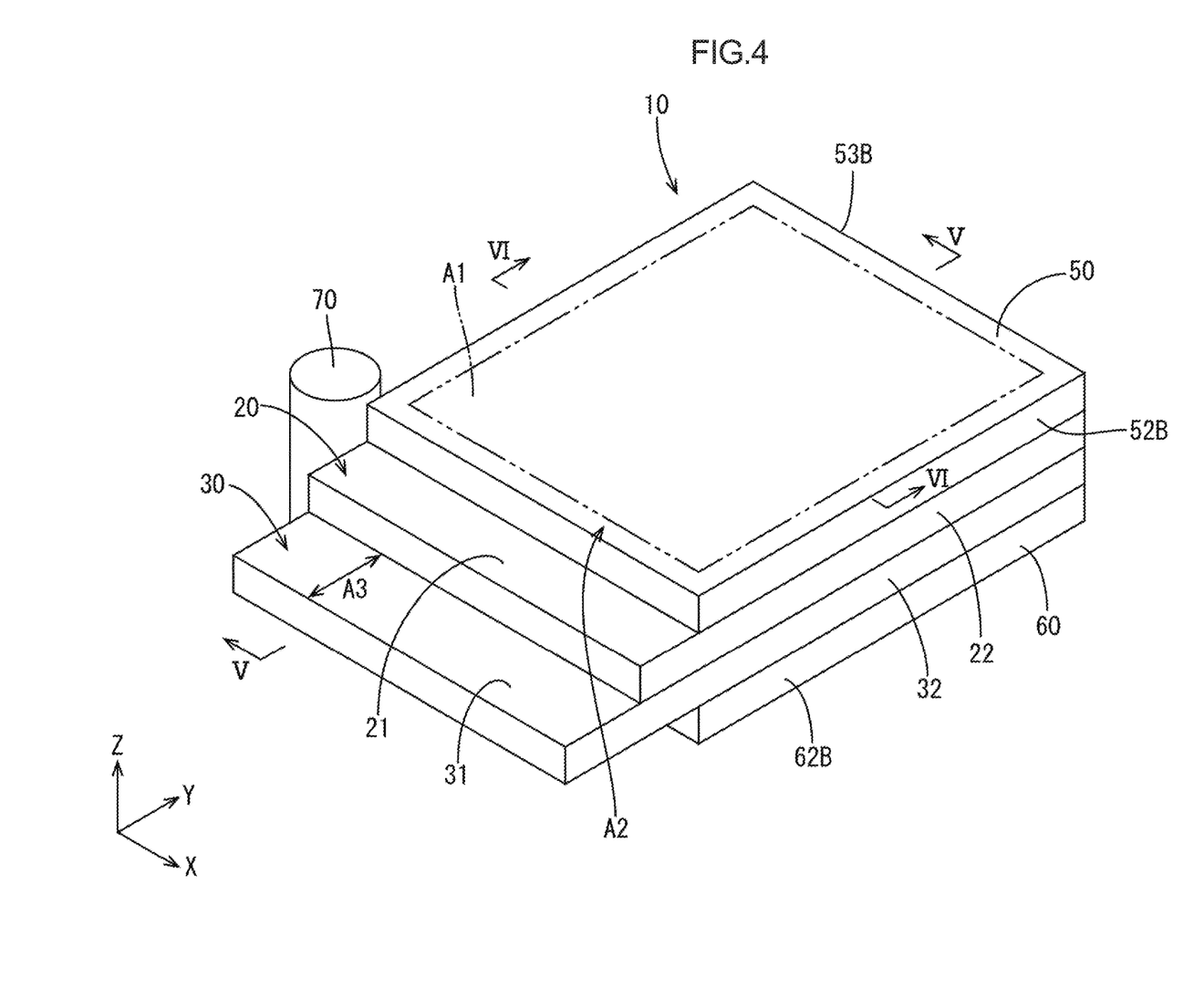
FIG. 4 is a perspective view indicating the polarizing plate trimming process.

As illustrated in FIGS. 3 and 4, in the polarizing plate trimming process after the polarizing plate attachment process, while the CF substrate 20, the array substrate 30, and the polarizing plates 50 and 60 are held by a clamp (not illustrated), the side surfaces 52A, 53A, and 54A of the polarizing plate 50 and the side surfaces 62A, 63A, and 64A of the polarizing plate 60 are ground by a cylindrical grinding stone 70 of a grinder (not illustrated) to remove the portions protruding from the side surfaces of the glass substrates 21 and 31 and polish the side surfaces of the glass substrates 21 and 31. The grinding stone 70 is moved along the three sides of the CF substrate 20 and the array substrate 30 (three sides not including one side near the mounting area A3). Specifically described, the grinding stone 70 grinds the side surfaces 52A and 62A (side surfaces of the two polarizing plates having the two substrates therebetween) at the same time and polishes the side surfaces 22 and 32 of the glass substrates 21 and 31. Furthermore, the grinding stone 70 grinds the side surfaces 53A and 63A at the same time and polishes the side surfaces 23 and 33. Furthermore, the grinding stone 70 grinds the side surfaces 54A and 64A at the same time and polishes the side surfaces 24 and 34 of the glass substrates 21 and 31. In other words, only three of the four side surfaces of each of the rectangular polarizing plates 50 and 60 are ground in the polarizing plate trimming process.

The side surfaces of the polarizing plates 50 and 60 are made flush with the side surfaces of the glass substrates 21 and 31 by this process. Specifically described, when the reference numerals 62B, 63B, and 64B denote the side surfaces 62A, 63A, and 64A of the polarizing plate 60 after grinding and the reference numerals 52B, 53B, and 54B denote the side surfaces 52A, 53A, and 54A of the polarizing plate 50 after grinding, the side surfaces 53B and 63B are flush with the side surfaces 23 and 33 of the glass substrates 21 and 31 as illustrated in FIG. 5 and the side surfaces 52B and 62B are flush with the side surfaces 22 and 32 of the glass substrates 21 and 31 as illustrated in FIG. 6. Furthermore, as illustrated in FIG. 6, the side surfaces 54B and 64B are flush with the side surfaces 24 and 34 of the glass substrates 21 and 31.

Next, the effect of the embodiment is described. In the method of this embodiment, the side surfaces of the glass substrates 21 and 31 and the side surfaces of the polarizing plates 50 and 60 are made flush with each other by grinding. This method reduces the possibility that a microcrack will be generated in a side surface of the liquid crystal panel 10 compared with a method in which large glass substrates and large polarizing plates are cut together to obtain the glass substrates 21 and 31 and the polarizing plates 50 and 60 (a method in which the side surfaces of the glass substrates 21 and 31 and the side surfaces of the polarizing plates 50 and 60 are made flush with each other by cutting).

The glass substrates 21 and 31 and the polarizing plates 50 and 60 each having a predetermined size may be separately formed and attached to each other to obtain the liquid crystal panel 10. If such a method is employed, the side surfaces of the polarizing plates 50 and 60 would be positioned inwardly from the side surfaces of the glass substrates 21 and 31, for example, due to the dimension or attachment tolerance of the polarizing plates 50 and 60. If the side surfaces of the polarizing plates 50 and 60 are positioned in the display area A1, the side surfaces are visible to users. Furthermore, as illustrated in FIG. 6, although a side surface of a polarizing plate (the side surface 64C of the polarizing plate 60 indicated by a two-dot chain line) is positioned in the non-display area A2, the side surface 64C is visible when the display area A1 (display surface) is viewed obliquely from the front side (upper side in FIG. 6) of the liquid crystal panel 10 as indicated by an arrow L1. To avoid such a consequence, the side surfaces of the polarizing plates 50 and 60 may be positioned outwardly from the glass substrates 21 and 31. However, this makes it difficult to narrow the frame. In the present embodiment, the polarizing plates 50 and 60 are positioned in the polarizing plate attachment process such that the outer peripheral portions thereof protrude from the glass substrates 21 and 31, and the outer peripheral portions of the polarizing plates 50 and 60 protruding from the glass substrates 21 and 31 are ground by the grinding stone 70 in the polarizing plate trimming process. This does not allow the side surfaces of the polarizing plates 50 and 60 to be positioned inwardly from the side surfaces of the glass substrates 21 and 31 and allows the frame to be narrowed.

In the polarizing plate trimming process, the side surfaces of the glass substrates 21 and 31 are polished by using the grinding stone 70. This removes a microcrack in a side surface of the glass substrate 21 or 31 if a microcrack exists, improving the strength of the glass substrates 21 and 31. Furthermore, in the polarizing plate trimming process, the side surfaces of the polarizing plates 50 and 60 having the glass substrates 21 and 31 therebetween are ground at the same time. The simultaneous trimming of the side surfaces of the polarizing plates 50 and 60 shortens the operation time. Furthermore, in the polarizing plate trimming process, only three of the four side surfaces of the polarizing plates 50 and 60 are ground and the other side near the mounting area A3 is not ground. The frame is wider at one side near the mounting area A3, and thus the side surfaces of the polarizing plates 50 and 60 are able to be positioned away from the display area within the frame, allowing the side surfaces of the polarizing plates 50 and 60 to be hardly visible. In other words, the side surfaces of the polarizing plates 50 and 60 at the one side near the mounting area A3 are able to be positioned inwardly from the side surfaces of the glass substrates 21 and 31 and do not need to be ground. Thus, this embodiment in which the side surfaces at only three of four sides of the polarizing plates 50 and 60 are ground requires less operation time than a configuration in which the side surfaces at all the four sides are ground. In this embodiment, the three side surfaces of each of the polarizing plates 50 and 60 are ground, but the present invention is not limited to this. At least one side surface of each of the polarizing plates 50 and 60 only has to be ground. For example, only two sides of each of the polarizing plates 50 and 60 at the ends in the X axis direction (side surfaces 52A, 54A, 62A, and 64A) may be ground.

Second Embodiment

Figure 7:
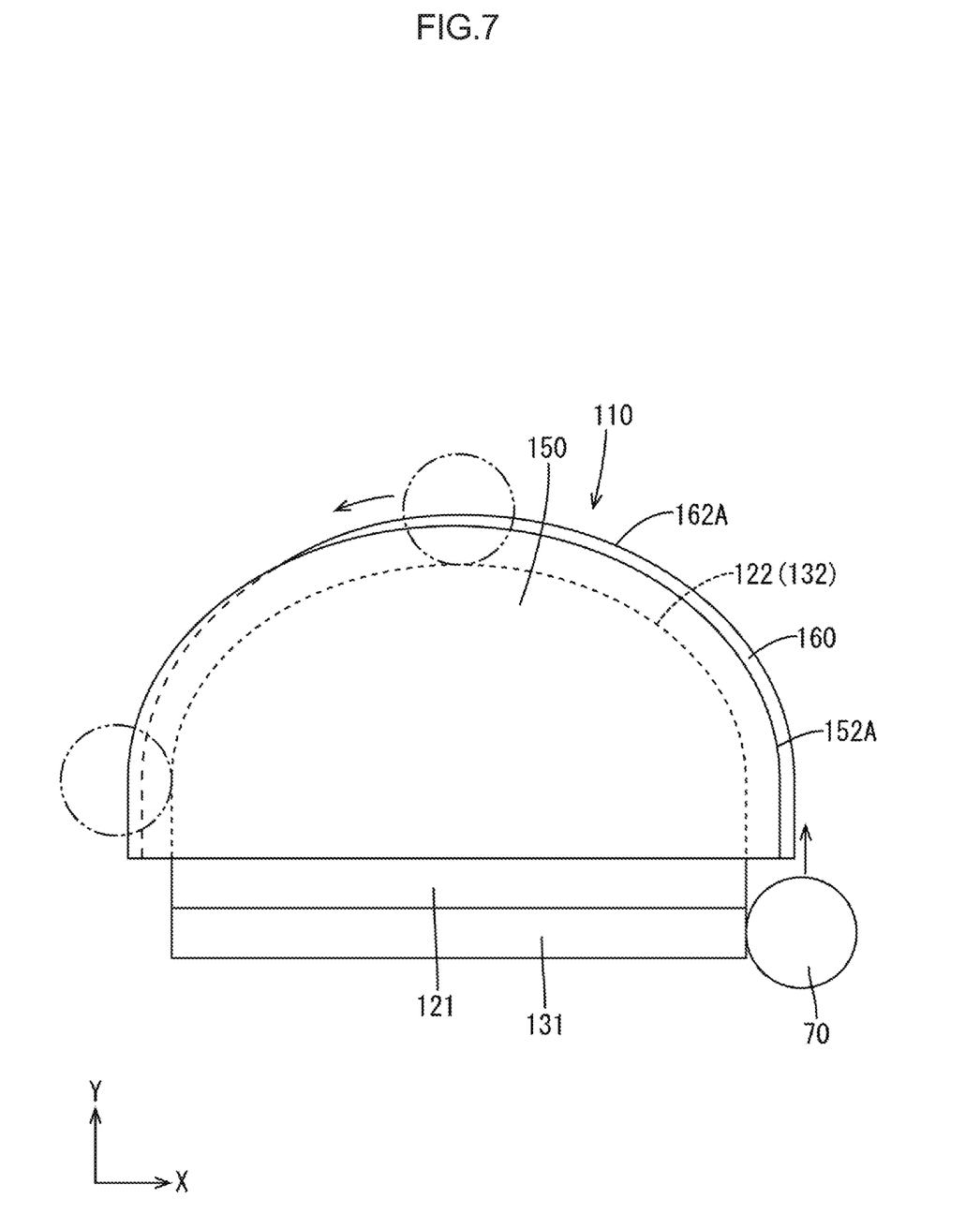
FIG. 7 is a plan view indicating a polarizing plate trimming process according to a second embodiment.

Next, a second embodiment of the present invention is described with reference to FIG. 7. In this embodiment, the shape of the liquid crystal panel differs from that in the first embodiment. The same components as those in the above embodiment are assigned the same reference numerals without duplicated explanation. As illustrated in FIG. 7, a liquid crystal panel 110 of this embodiment has a substantially semi-circular shape. In this configuration, the polarizing plates 150 and 160 and the glass substrates 121 and 131 have the curved side surfaces (grinding target surfaces). In the polarizing plate trimming process of this embodiment, the grinding stone 70 is moved along the side surfaces 122 and 132 of the glass substrates 121 and 131 to grind the side surfaces 152A and 162A of the polarizing plates 150 and 160 to be flush with the side surfaces 122 and 132. The method using the grinding stone 70 is readily applicable to the liquid crystal panel 110 having a curved side surface and allows a liquid crystal panel not having a rectangular shape to have a narrower frame.

Other Embodiments

The present invention is not limited to the embodiments described above and illustrated by the drawings. For example, the following embodiments will be included in the technical scope of the present invention.

(1) In the above-described embodiments, the grinding stone is used to trim the polarizing plates in the polarizing plate trimming process. However, the polarizing plates may be ground by another tool. For example, only the polarizing plates may be ground in the polarizing plate trimming process. In such a case, a blade may be moved along the side surfaces of the glass substrate to cut the side surfaces of the polarizing plates such that the side surfaces of the polarizing plates become flush with the side surfaces of the glass substrates. The means for trimming the polarizing plates are not limited to grinding and cutting.

(2) The shape of the liquid crystal panel is not limited to that in the above-described embodiments and may be suitably changed. For example, the shape of the liquid crystal panel may be circular or oval.

(3) In the above-described embodiments, polishing of the glass substrates 21 and 31 is performed concurrently with the grinding of the polarizing plates 50 and 60 in the polarizing plate trimming process. However, the polarizing plate trimming process is not limited to this. Only the grinding of the polarizing plates 50 and 60 may be performed in the polarizing plate trimming process.

(4) In the above-described embodiments, the polarizing plates 50 and 60 are ground at the same time in the polarizing plate trimming process. However, the polarizing plate trimming process is not limited to this. The polarizing plates 50 and 60 may be sequentially ground. Alternatively, only one of the polarizing plates (for example, only the polarizing plate 60) may be ground.

EXPLANATION OF SYMBOLS

10, 110: liquid crystal panel (display panel)
21, 31, 121, 131: glass substrate (substrate)
32, 33, 34: side surface (side surface of substrate)
50, 60, 150, 160: polarizing plate
52A, 53A, 54A, 52B, 53B, 54B: side surface of polarizing plate
70: grinding stone (grinder)

The invention claimed is:

1. A method of producing a display panel, the method sequentially comprising:
    a polarizing plate attachment process of attaching a polarizing plate to a surface of a substrate with a side surface of the polarizing plate being positioned outwardly from a side surface of the substrate; and
    a polarizing plate trimming process of trimming the side surface of the polarizing plate such that the side surface of the polarizing plate becomes flush with the side surface of the substrate,
    wherein, in the polarizing plate trimming process, the side surface of the substrate is polished with a grinder used for trimming the side surface of the polarizing plate.

2. The method of producing a display panel according to claim 1, wherein, in the polarizing plate trimming process, two polarizing plates having two opposing substrates therebetween are simultaneously trimmed at side surfaces.

3. The method of producing a display panel according to claim 1, wherein the substrate and the polarizing plate have a rectangular shape, and
    only three out of four side surfaces of the polarizing plate are trimmed in the polarizing plate trimming process.

* * * * *